United States Patent [19]
Takagi et al.

[11] Patent Number: 5,313,246
[45] Date of Patent: May 17, 1994

[54] EXPOSURE CONTROL DEVICE IN A CAMERA

[75] Inventors: Tadao Takagi, Yokohama; Tadao Kai, Kawasaki; Shigeyuki Uchiyama; Hiroyuki Iwasaki, both of Tokyo, all of Japan

[73] Assignee: Nikon Corporation, Tokyo, Japan

[21] Appl. No.: 995,528

[22] Filed: Dec. 22, 1992

Related U.S. Application Data

[63] Continuation of Ser. No. 886,317, May 22, 1992, abandoned, which is a continuation of Ser. No. 577,157, Sep. 4, 1990, abandoned.

[30] Foreign Application Priority Data

Sep. 6, 1989 [JP] Japan .................................. 1-231041

[51] Int. Cl.⁵ .............................................. G03B 13/00
[52] U.S. Cl. ...................................... 354/408; 354/432
[58] Field of Search ................................ 354/400–409, 354/432

[56] References Cited

U.S. PATENT DOCUMENTS 4,768,052  8/1988  Hamada et al. ..................... 354/402
4,977,423  12/1990  Yamano et al. ..................... 354/432

FOREIGN PATENT DOCUMENTS 61-279829  12/1986  Japan .

Primary Examiner—David M. Gray
Attorney, Agent, or Firm—Shapiro and Shapiro

[57] ABSTRACT

An exposure control device in a camera comprises a focus detection device for calculating a plurality of defocus amounts corresponding to a plurality of focus detection areas, a weight producing device for producing a plurality of weights corresponding to the plurality of focus detection areas on the basis of the plurality of defocus amounts, a light metering device for light-metering a plurality of light metering areas at least partly overlapping with the plurality of focus detection areas and producing a plurality of light metering outputs, and an exposure amount calculating device for calculating a proper exposure amount on the basis of the plurality of weights and the plurality of light metering outputs.

18 Claims, 10 Drawing Sheets

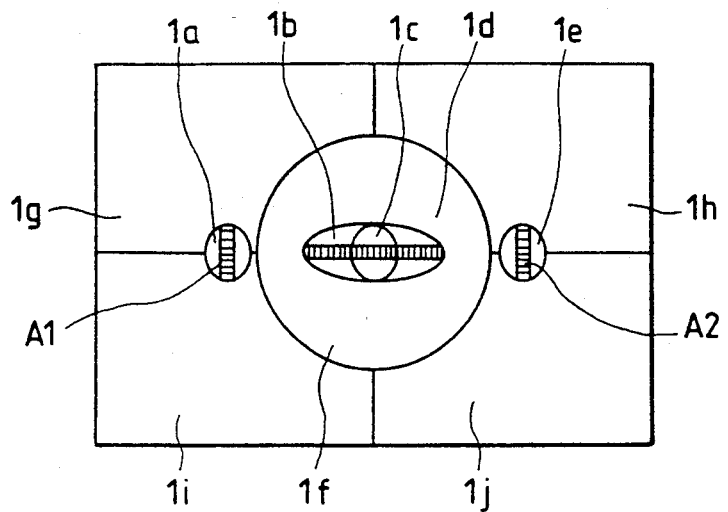
FIG. 8
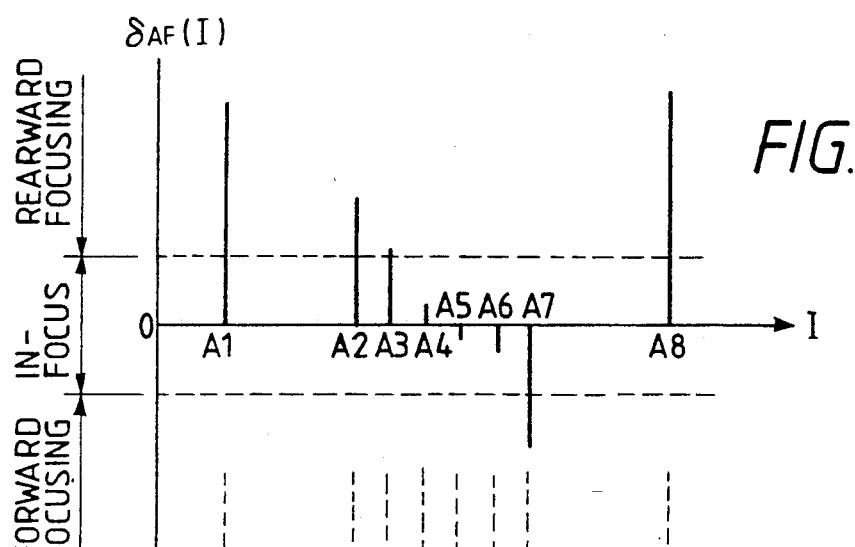
FIG. 9A
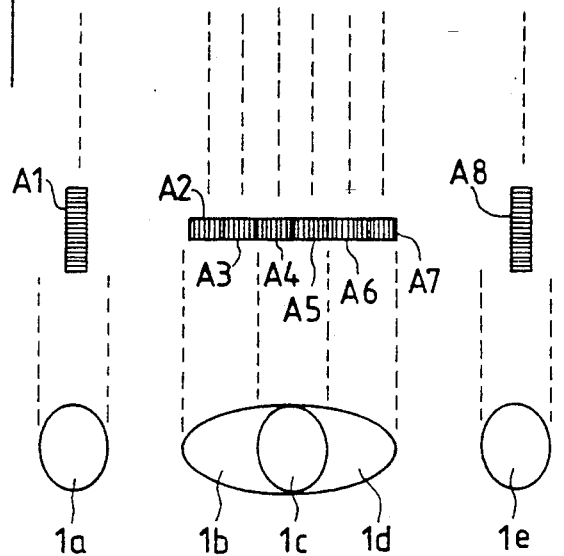
FIG. 9B
FIG. 9C

EXPOSURE CONTROL DEVICE IN A CAMERA This is a continuation of application Ser. No. 886,317 filed May 22, 1992, which is a continuation of application Ser. No. 577,157 filed Sep. 4, 1990, both of which are now abandoned.

BACKGROUND OF THE INVENTION

1. Field of the Invention

This invention relates to an exposure control device in a camera.

2. Related Background Art

There has heretofore been an exposure control device in a camera which effects the distance measurement of a plurality of areas of the object field and carries out exposure calculation by the use of the output of a light metering area corresponding to an area which is in focus.

In such device, however, too much importance is attached to the output of the light metering area corresponding to the area which is in focus and use is not made of the output of a light metering area corresponding to an area which is out of focus, and this has led to the problem that the resultant photograph partly obtains proper exposure, but generally suffers from unbalanced exposure.

This problem is particularly severe in a scene wherein the luminance difference is great.

SUMMARY OF THE INVENTION

The present invention has been made in view of such a problem peculiar to the prior art and has as its object the provision of an exposure control device in a camera which can always obtain well-balanced exposure.

To achieve this object, in the present invention, there is constructed an exposure control device which detects a defocus amount for each of a plurality of detection areas in the object field, sets a weighting amount corresponding to each of said plurality of detection areas on the basis of said plurality of detected defocus amounts, light-meters said plurality of detection areas and calculates proper exposure on the basis of the light metering information of said plurality of detection areas and said weighting amounts.

With regard to the weighting in an embodiment of the present invention, the defocus amount is divided into one for the forward focusing area and one for the rearward focusing area, and even for the same defocus amount, the weighting amount of the forward focusing area and the weighting amount of the rearward focusing area are set to different values.

Further, in an embodiment of the present invention, there is provided a distance measuring element array for focus detection and light metering is effected by the use of the output of said distance measuring element array.

Furthermore, in an embodiment of the present invention, there is provided light metering means for light-metering the outside of a plurality of detection areas, and when a defocus amount within a predetermined value exists among a plurality of calculated defocus amounts, proper exposure is calculated by the use of the light metering information in the plurality of detection areas, and when the defocus amount within the predetermined value does not exist, proper exposure is calculated by the use of the light metering information outside the plurality of detection areas.

In such an exposure control device in a camera according to the present invention, the focus detection areas are classified by the amount of out-of-focus and the result thereof is used for the calculation of proper exposure and therefore, there can be obtained photographs of well-balanced exposure and the problem peculiar to the prior art can be solved.

BRIEF DESCRIPTION OF THE DRAWINGS

FIG. 8 shows the positional relation between the light metering photoelectric conversion element of split metering means in a third embodiment of the present invention and the photoelectric conversion element group of focus detection means.

FIGS. 9A, 9B and 9C show the relations between the in-focus state of each area and the light metering area corresponding to each area when in the third embodiment, the photoelectric conversion element group is divided into eight areas.

DESCRIPTION OF THE PREFERRED EMBODIMENTS

Figure 1:
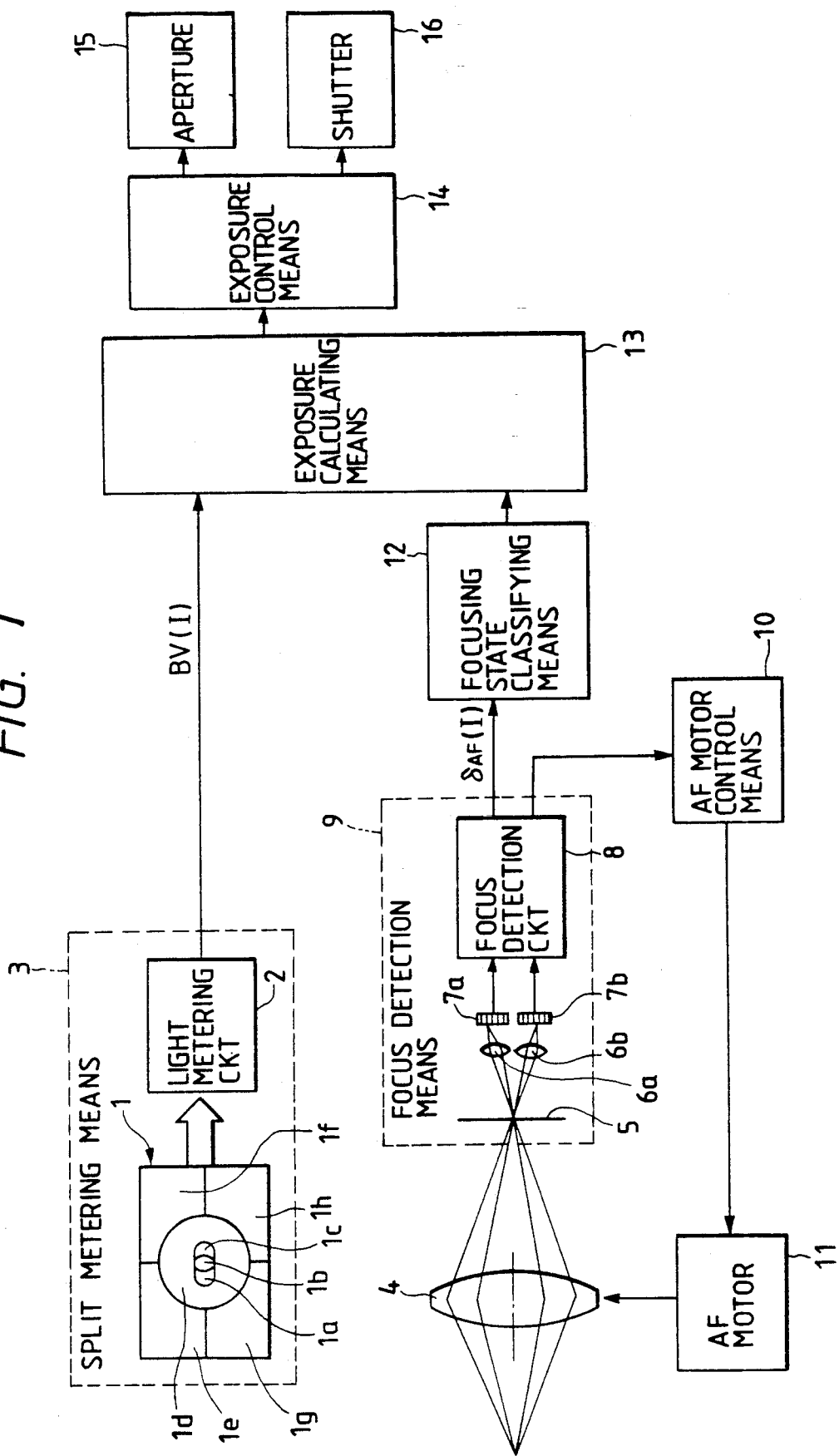
FIG. 1 is a block diagram of a first embodiment of the device according to the present invention.

FIG. 1 is a block diagram showing an embodiment of the present invention.

In FIG. 1, the reference numeral 4 designates a photo-taking lens which, in the present embodiment, is focus-controlled by an AF motor 11. Focus detection means 9 is provided rearwardly of the photo-taking lens 4, and re-coupling lenses 6a, 6b and photoelectric conversion element groups 7a, 7b are disposed rearwardly of the predetermined focal plane 5 of the lens 4. The outputs of the photoelectric conversion element groups 7a and 7b are input to a focus detection circuit 8, in which the imaged positions of the photoelectric conversion element groups 7a and 7b are compared with each other, whereby in-focus or out-of-focus is determined, and when the lens is out of focus, forward focusing or rearward focusing is determined and further, the defocus amount $\delta_{AF}(1)$ of the forward focusing or the rearward focusing is calculated.

Each of the photoelectric conversion element groups 7a and 7b is an element group comprising 120 picture elements, and in this embodiment, each group is divided, for example, into six detection areas (I=1-6), and the defocus amounts $\delta_{AF}(1)$ - $\delta_{AF}(6)$ in the respective detection areas are detected.

The output of the focus detection circuit 8 provided in the focus detection means 9 is input to focusing state classifying means 12 and AF motor control means 10. The AF motor control means 10, during out-of-focus, moves the lens 4 by an AF motor 11 and causes it to reach the in-focus state.

The focusing state classifying means 12 classifies each detection area from the defocus amounts $\delta_{AF}(1)$ - $\delta_{AF}(6)$ into one of 1 considerable forward focusing,
2 somewhat forward focusing,
3 in-focus,
4 somewhat rearward focusing, and
5 considerable rearward focusing, and gives it a weighting amount D(I) and outputs it to exposure calculating means 13. The details of this will be described later with reference to FIG. 4.

The reference numeral 3 denotes split metering means provided with a light metering photoelectric conversion element 1 and a light metering circuit 2. The light metering photoelectric conversion element 1 divides the object field into eight areas, i.e., central portions 1a-1c, the near-central portion 1d and marginal portions 1e-1h, as shown, and light-meters these areas. The positions of the central area 1a-1c in the light metering photoelectric conversion element 1 are in a relation corresponding to the distance measuring zone position in the focus detection means 9. The details of this correspondence relation will be described later with reference to FIG. 2.

The light metering outputs from the light metering photoelectric conversion element 1 divided into eight areas are input to the light metering circuit 2. The light metering circuit 2 converts each light metering output into a luminance value BV(I) by the use of a fully open F value signal $F_o$, not shown, of the photo-taking lens 4, and outputs it to the exposure calculating means 13.

The exposure calculating means 13 receives the output of the split metering means 3 and the output of the focusing state classifying means 12, calculates proper exposure B in accordance with an algorithm which will be described later with reference to FIG. 5 and outputs it to exposure control means 14. In response to this output, the exposure control means 14 controls an aperture 15 and a shutter 16.

The positional relations between the central areas 1a-1c of the light metering photoelectric conversion element 1 and the photoelectric conversion element group 7 of the focus detection means 9 will now be described with reference to FIGS. 2, 3B and 3C.

Figure 2:
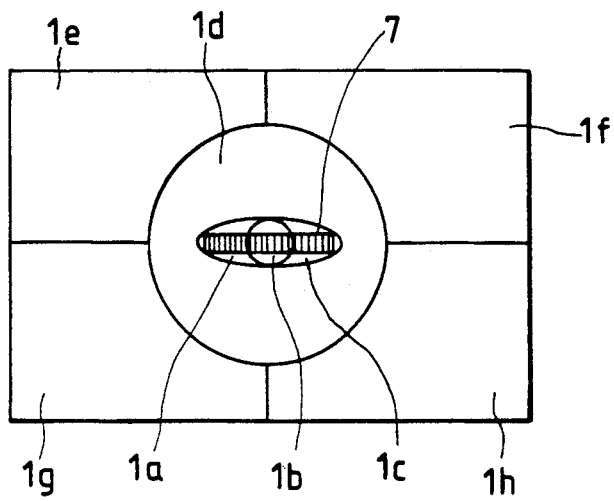
FIG. 2 shows the positional relation between the light metering photoelectric conversion element of split metering means and the photoelectric conversion element group of focus detection means.

As shown in FIG. 2, the lengthwise widths of the central areas 1a-1c of the light metering photoelectric conversion element 1 are set to the substantially the same as the lengthwise width of the photoelectric conversion element group 7. Further, as shown in FIGS. 3B and 3C, areas A1 and A2 occupying the left one-third of the photoelectric conversion element group 7 are disposed correspondingly to the light metering area 1a at the left of the central portion, areas A3 and A4 occupying the central one-third of the photoelectric conversion element group 7 are disposed correspondingly to the central light metering area 1b of the central portion, and areas A5 and A6 occupying the right one-third of the photoelectric conversion element group 7 are disposed correspondingly to the light metering area 1c at the right of the central portion.

Figure 3A:
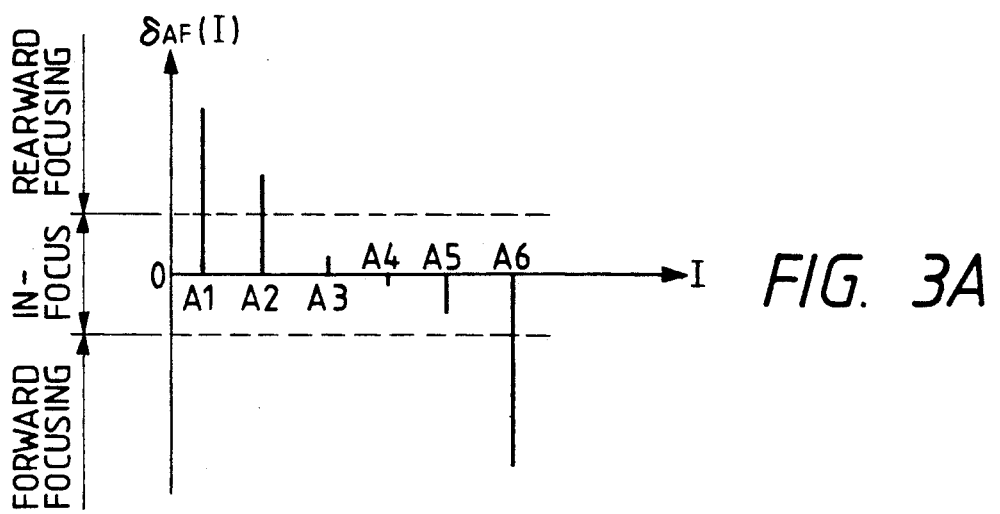
FIGS. 3A, 3B and 3C show the relations between the in-focus state of each area and the light metering area corresponding to each area when the photoelectric conversion element group is divided into six areas.
Figure 3B:
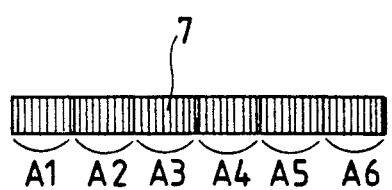
Figure 3C:
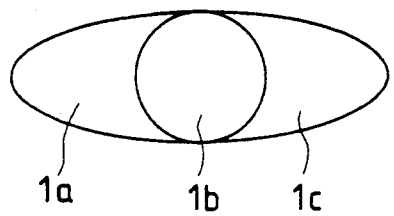

FIG. 3A plots the areas A1-A6 of the photoelectric conversion element group along the horizontal axis and the defocus amount $\delta_{AF}$ and the direction thereof along the vertical axis, and the positional relation of the horizontal axis corresponds to FIGS. 3B and 3C. Each of areas A1-A6 is an aggregate of photoelectric conversion elements, and each of these areas is designed so as to be capable of detecting the absolute value of the defocus amount and the direction thereof (forward focusing, in-focus or rearward focusing). In this embodiment, the areas A1 and A2 represent the rearward focusing, the areas A3-A5 are within a predetermined defocus amount and therefore represent in-focus, and the area A6 represents forward focusing.

The substance of the processing by the focusing state classifying means 12 will now be described with reference to FIG. 4.

First at S1, the program starts, and at S2, the initial value of I=0 is set. At S3, I+1 is substituted for the area number, and at S4, the defocus amount $\delta_{AF}(I)$ is read.

Here, as regards the signs of $\delta_{AF}(I)$, + represents forward focusing and − represents rearward focusing, and I corresponds to the areas A1-A6 of FIG. 3A.

At first, I=1 and therefore, at S5, whether $\delta_{AF}(1)$ is greater than 150 μm is discriminated with the area A1 as the object, and if it is greater than 150 μm, it means considerable forward focusing and thus, advance is made to S6, where D(1)=0 is allotted to the area 1 (I=1). If $\delta_{AF}(1)$ is not greater than 150 μm, advance is made to S7, where whether $\delta_{AF}(1)$ is within the range of $$50 \ \mu m < \delta_{AF}(1) \leq 150 \ \mu m$$

is discriminated, and if it is within said range, it means somewhat forward focusing and thus, advance is made to S8, where D(1)=2 is allotted.

If $\delta_{AF}(1)$ is not within said range, advance is made to S9, where whether $\delta_{AF}(1)$ is within the range of $$-50 \ \mu m \leq \delta_{AF}(1) \leq 50 \ \mu m$$

is discriminated, and if it is within this range, it means in-focus and thus, advance is made to S10, where D(1)=3 is allotted.

If $\delta_{AF}(1)$ is not within said range, advance is made to S11, where whether $\delta_{AF}(1)$ is within the range of $$-150 \ \mu m \leq \delta_{AF} < -50 \ \mu m$$

is discriminated, and if it is within this range, it means somewhat rearward focusing and thus, advance is made to S12, where D(1)=1 is allotted. If $\delta_{AF}(1)$ is not within said range, it means considerable rearward focusing and thus, advance is made to S13, where D(1)=0 is allotted.

When the above-described classification is terminated, advance is made to S14, and since I is not I=6, return is made to S3, where similar allotment is effected with respect to the next I=2 (the area A2). When the allotment of all the six areas is terminated, advance is made to S15, where outputting to the exposure calculating means 13 is effected, and at S16, the program comes to an end.

Figure 5:
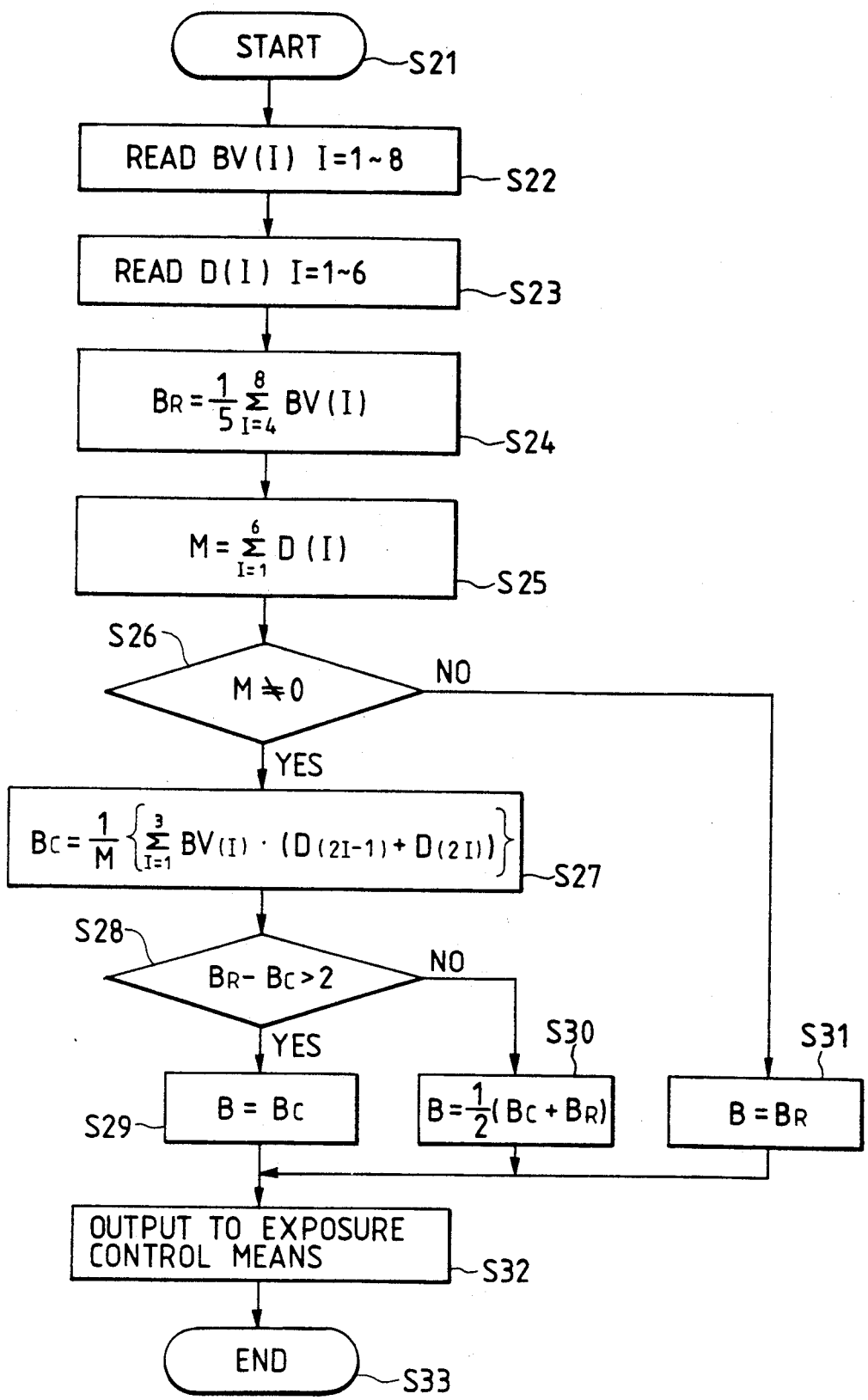
FIG. 5 is a flow chart of the processing by exposure calculating means.

FIG. 5 shows the substance of the processing by the exposure calculating means 13. The program starts from S21, and at S22, the luminance output BV(I) of the split metering means 3 is read. I indicates the number of the divided light metering areas, and has a value of I=1-8. I=1 corresponds to the output of the portion 1a of the photoelectric conversion element, I=2 corresponds to the portion 1b, and likewise I=8 corresponds to the portion 1h.

Subsequently, at S23, D(I)(I=1-6) allotted to each distance measuring area by the processing by the focusing state classifying means 12 shown in FIG. 1 is read.

At S24, the average luminance value $B_R$ of the five areas of I=4-8 is calculated in accordance with the following equation:

$$B_R = \left( \sum_{I=4}^{8} BV(I) \right)/5. \tag{1}$$

At S25, the sum of D(1)-(6) is found in accordance with the following equation:

$$M = \sum_{I=1}^{6} D(I). \tag{2}$$

If at S26, M≠0, at least one of the six areas A1-A6 is in focus or approximate thereto and therefore, advance is made to S27, where weighting is effected to the respective luminance values of the areas 1a, 1b and 1c in the in-focus state in accordance with the following equation:

$$B_c = \left\{ \sum_{I=1}^{3} BV(I) \cdot (D(2I-1) + D(2I)) \right\}/M \tag{3}$$

and the luminance value of the central portion is calculated.

As is apparent from these equations (1)-(3), more importance is attached to the light metering value of the portion which is better in the in-focus state.

At S28, the luminance difference between $B_R$ and $B_c$ is calculated, and when it exceeds 2EV, advance is made to S29, where the calculated value $B_c$ of only the central portion is given as the exposure value to B. When the luminance difference is 2EV or less, advance is made to S30, where the average $(B_c + B_R)/2$ of the central portion and the marginal portion is given as the exposure value to B.

If at S26, M=0, all of the six areas A1-A6 are considerable forward focusing or considerable rearward focusing and therefore, advance is made to S31, where the calculated value $B_R$ of the marginal portion is given as the exposure value to B.

Then, advance is made to S32, where the result is output to the exposure control means 14, and at S33, the program comes to an end.

Figure 6:
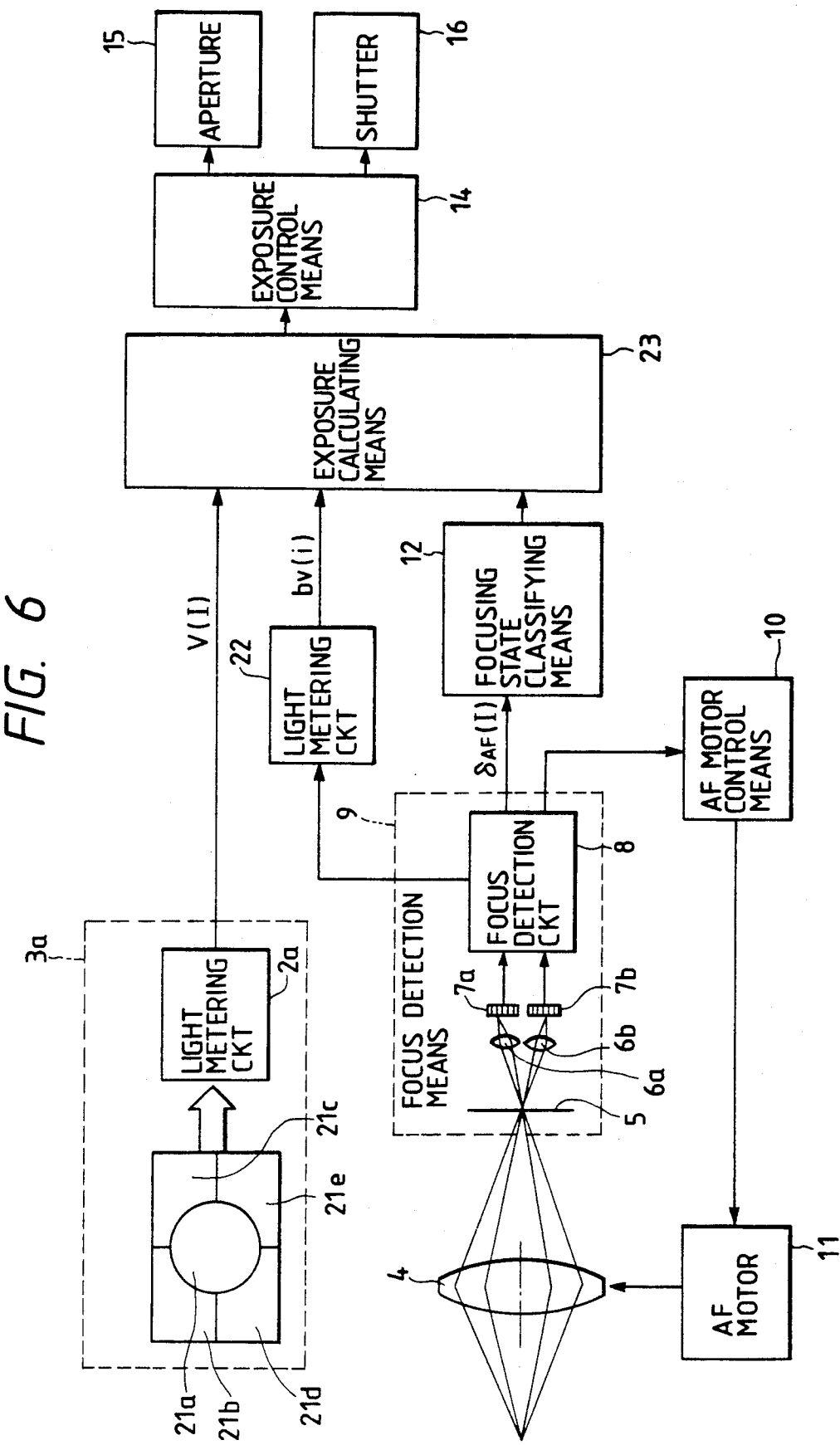
FIG. 6 is a block diagram showing a second embodiment of the present invention.

FIG. 6 shows a second embodiment of the present invention. In FIG. 6, portions functionally similar to those in FIG. 1 are given identical reference numerals and need not be described.

The differences of the FIG. 6 embodiment from the FIG. 1 embodiment are that photoelectric conversion means provided in the split metering means 3a is divided into five areas 21a-21e and that the light metering of the central portion is found from the output of the focus detection circuit 8. A light metering circuit 22 is designed to determine the luminance value in conformity with the charge accumulation time of each element of the CCD type photoelectric conversion element group 7 obtained in the focus detection circuit 8, but this is not always required in carrying out the invention.

Figure 7:
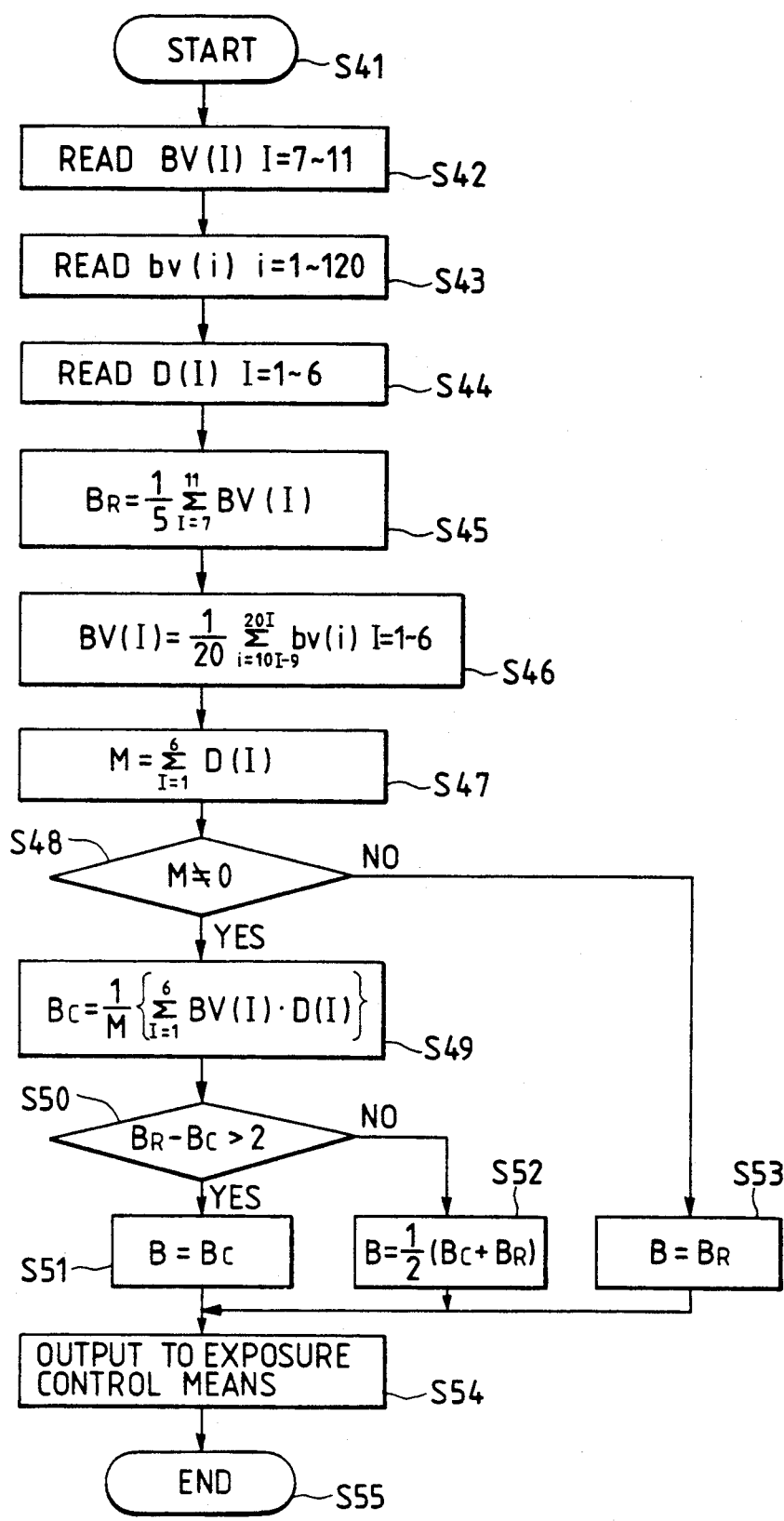
FIG. 7 is a flow chart of the processing by the exposure calculating means of the second embodiment.

FIG. 7 shows the substance of the processing by exposure calculating means 23.

First, at S41, the program starts, and at S42, the luminance values of the areas 21a-21e of the photoelectric conversion element 21 are read as BV(7)-BV(11). Subsequently, at S43, from the light metering circuit 22, the luminance values bv(i) of the respective elements of the distance measuring photoelectric conversion element group 7 are read up to bv(1) - bv(120). Then, at S44, from the focusing state classifying means 12, D(I) is read up to D(1) - D(6).

At S45, the average luminance value of the areas 21a-21e of the photoelectric conversion element 21 is calculated in accordance with the following equation:

$$B_R = \left( \sum_{I=7}^{11} BV(I) \right)/5. \tag{4}$$

At S46, in accordance with the following equation:

$$BV(I) = \left( \sum_{i=10I-9}^{20} bv(i) \right)/20, \tag{5}$$

the average value of bv(1) - bv(20) is allotted to BV(1), and the average value of bv(21)-bv(40) is allotted to BV(2), and likewise up to BV(6).

At S47, the sum of D(1)-D(6) is found in accordance with the following equation:

$$M = \sum_{I=1}^{6} D(I). \tag{6}$$

If at S48, M≠0, at least one area is in focus or approximate thereto and therefore, advance is made to S49, where weighting is effected to the luminance values of the respective areas in the in-focus state in accordance with the following equation:

$$B_c = \left( \sum_{I=1}^{6} BV(I) \cdot D(I) \right)/M \tag{7}$$

and the luminance value of the central portion is calculated.

As is apparent from these equations (4)-(7), more importance is attached to the light metering value of the portion in which the in-focus state is better. S50-S55 are similar to S28-S33 of FIG. 5 and therefore need not be described.

FIGS. 8 to 12 show a third embodiment of the present invention.

This third embodiment is such that as shown in FIG. 8, light metering areas 1a and 1e and distance measuring areas A1 and A2 corresponding thereto are newly disposed in the marginal portion of FIG. 2.

FIG. 9A plots the distance measuring areas A1-A8 of the photoelectric conversion element group along the horizontal axis and plots the defocus amount $\delta_{AF}$ and the direction thereof along the vertical axis, and the positional relations between the distance measuring areas A1-A8 along the horizontal axis are shown in FIG. 9B, and the positional relations between the light metering areas 1a–1e along the horizontal axis are shown in FIG. 9C.

Figure 11:
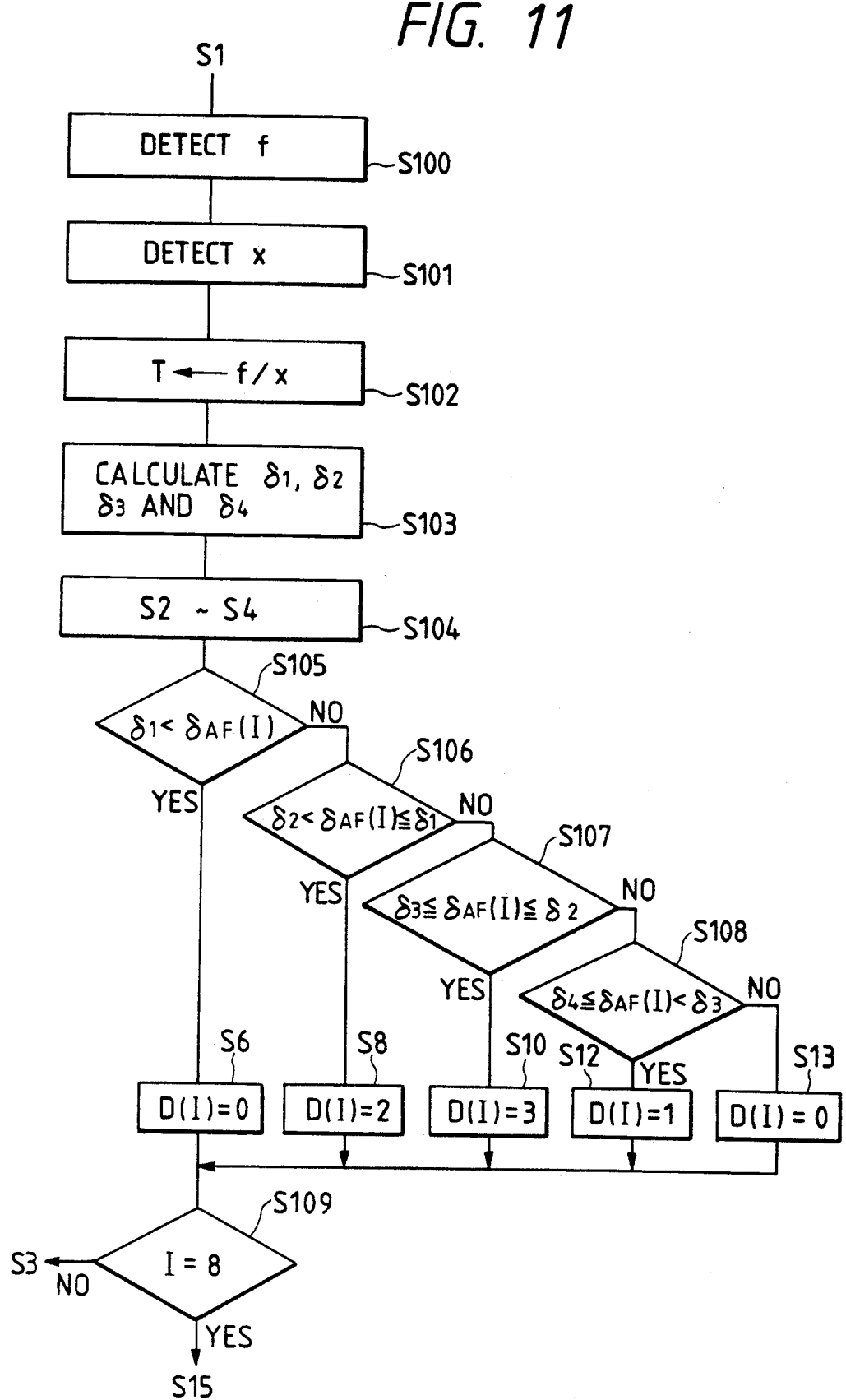
FIG. 11 is a flow chart of the processing by focusing state classifying means.

The third embodiment is characterized in that in the process flow of FIG. 11 by the focusing state classifying means, the boundary value of the classification of the defocus amount is changed by a photographing magnification M.

That is, at S100 of FIG. 11, the focal length f is detected, and at S101, the photographing distance x is detected and further, at S102, the photographing magnification T is calculated as $T = f/x$.

Figure 10:
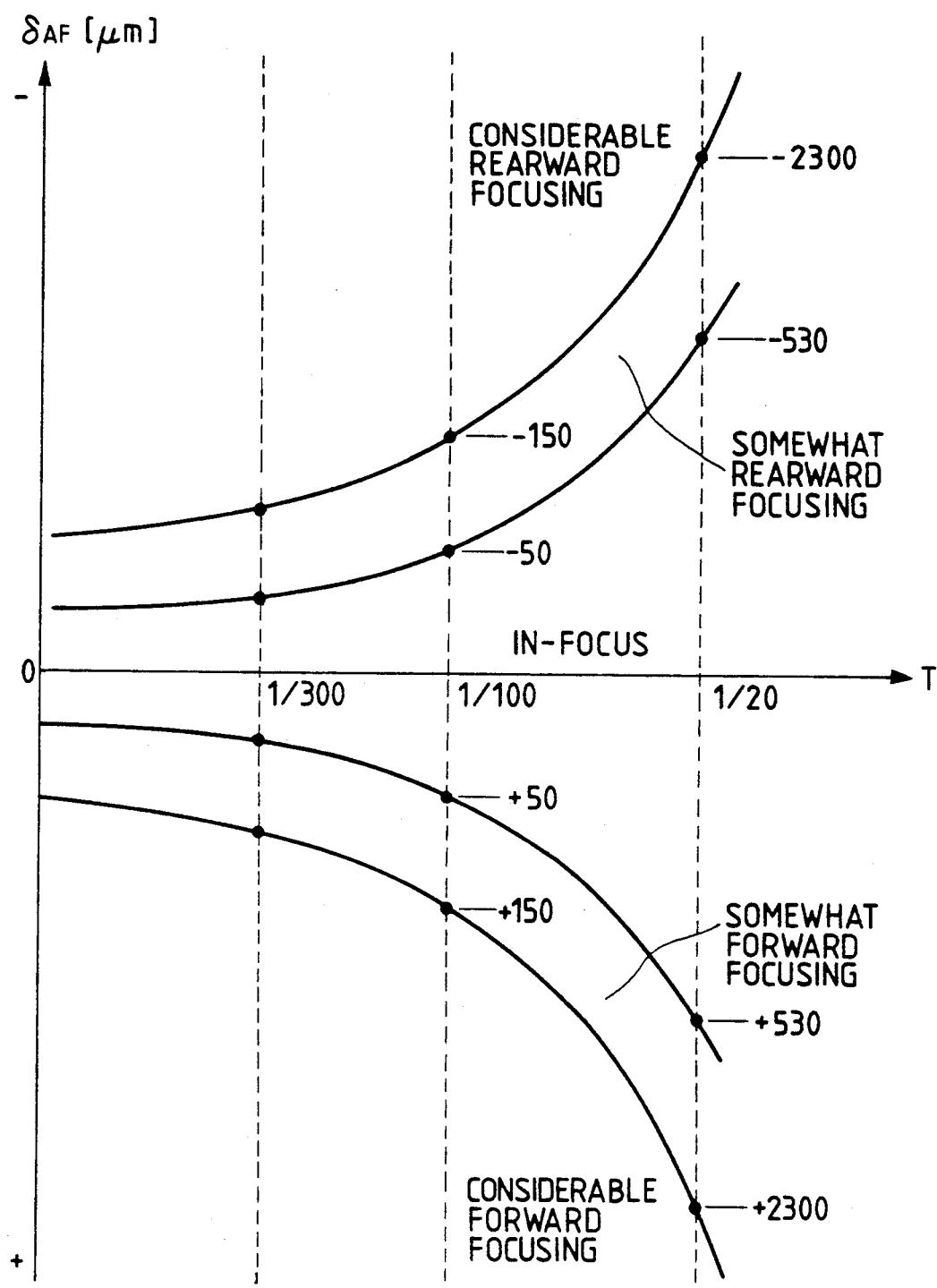
FIG. 10 shows the curves of the classification boundary values of the amount of out-of-focus in the process flow of FIG. 11 relative to the photographing magnification.

Subsequently, by the process of S103, the boundary values $\delta_1$–$\delta_4$ of the classification of the defocus amount are calculated as:

$\delta_1 = (9 \times 10^5) \cdot T^2 + 60$ $\delta_2 = (2 \times 10^5) \cdot T^2 + 30$ $\delta_3 = (-2 \times 10^5) \cdot T^2 - 30$ $\delta_4 = (-9 \times 10^5) \cdot T^2 - 60$ FIG. 10 shows examples of the curves of the boundary values $\delta_1$–$\delta_4$ of the classification of the defocus amount obtained in the process of S100–S103 of FIG. 11 relative to the photographing magnification T.

Figure 4:
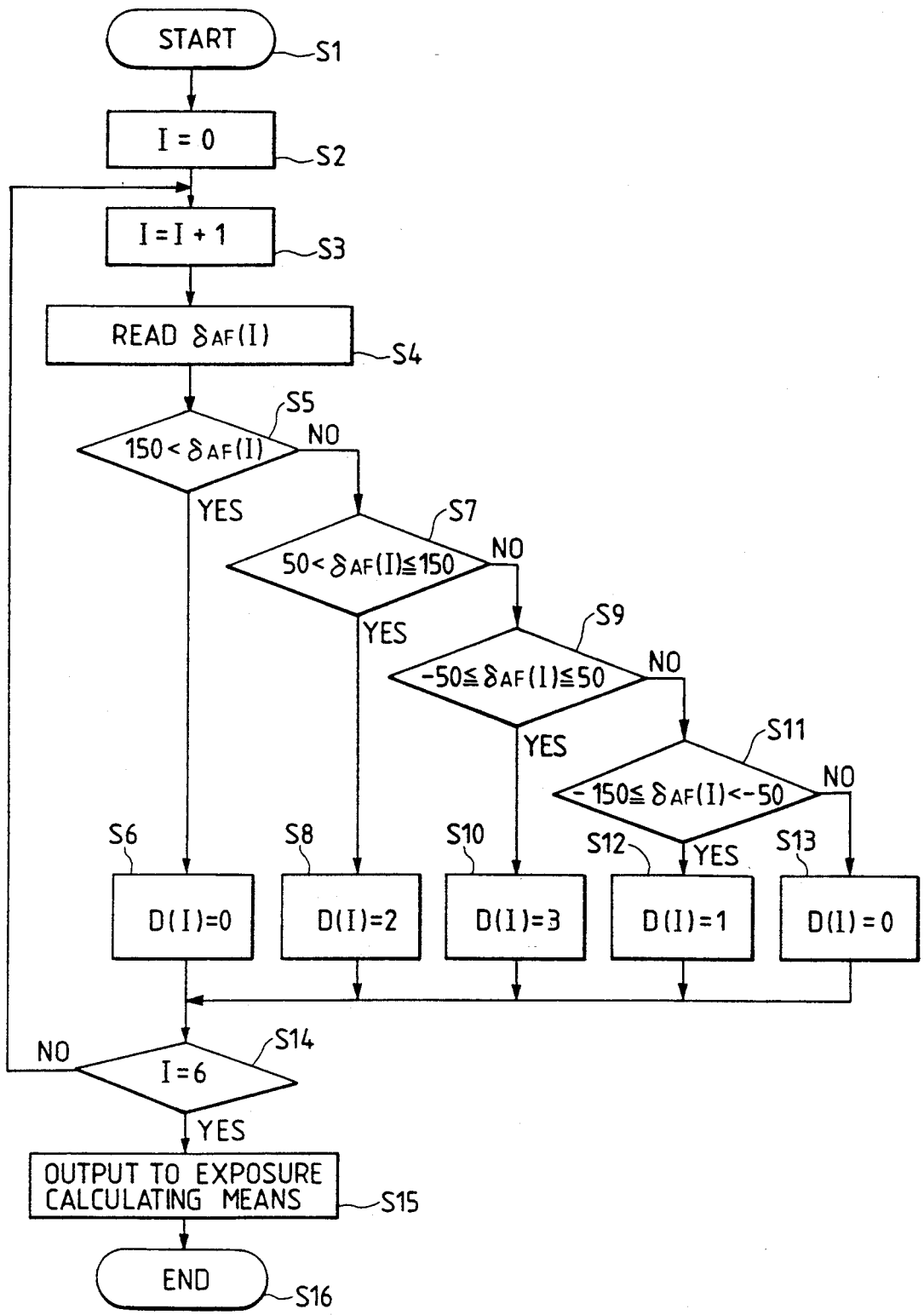
FIG. 4 is a flow-chart of the processing by focusing state classifying means.

In FIG. 10, specifically examining, for example, the boundaries of the classification relative to the photographing magnification T, when $T = 1/100$, $+150 < \delta_{AF}$   considerable forward focusing $+50 < \delta_{AF} \leq +150$   somewhat forward focusing $-50 \leq \delta_{AF} \leq +50$   in-focus $-150 \leq \delta_{AF} < -50$   somewhat rearward focusing $\delta_{AF} < -150$   considerable rearward focusing and when $T = 1/20$, $+2300 < \delta_{AF}$   considerable forward focusing $+530 \leq \delta_{AF} \leq +2300$   somewhat forward focusing $-530 \leq \delta_{AF} \leq +530$   in-focus $-2300 \leq \delta_{AF} < -530$   somewhat rearward focusing $\delta_{AF} < -2300$   considerable rearward focusing The process of S104 and so on of FIG. 11 is basically the same as that of FIG. 4, but differs from the latter in that the boundary values at S105, S106, S107 and S108 are boundary values $\delta_1$–$\delta_4$ calculated at S103. Also, the maximum value of the area number I of S109 is $I = 8$.

Figure 12:
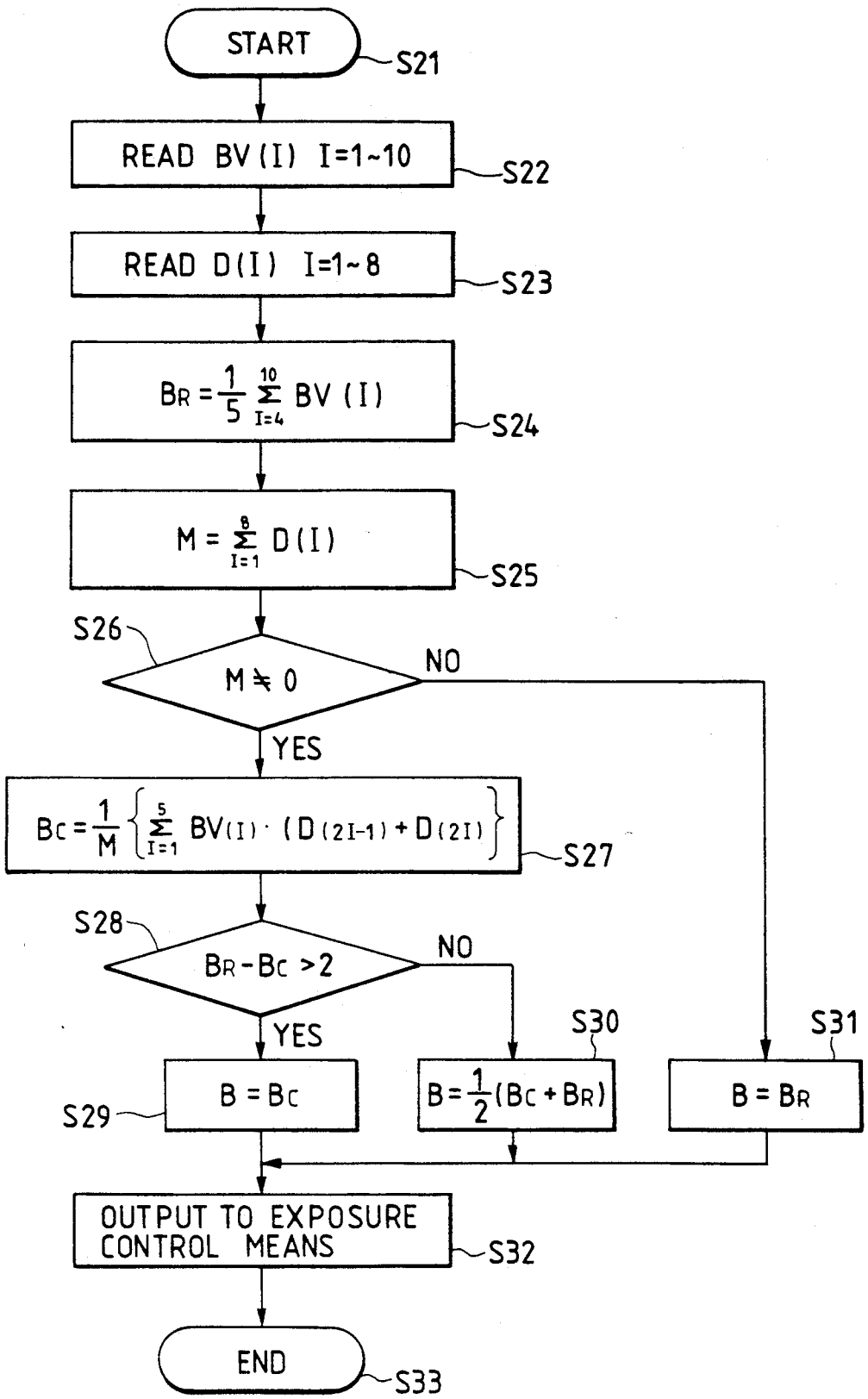
FIG. 12 is a flow chart of the processing by exposure calculating means.

FIG. 12 shows the process flow by the exposure calculating means of the third embodiment executed subsequently to the process of FIG. 11, and corresponds to the process flow of FIG. 5.

In the case of FIG. 12, as shown in FIG. 8, the distance measuring areas are increased to eight, i.e., A1–A8, and the light metering areas are increased to ten, i.e., 1a–1j, and therefore, correspondingly thereto, at S22, the luminance output BV(I) is read with respect to $I = 1$–10, and at S23, on the assumption that $I = 1$–8, D(I) allotted to each distance measuring area by the process of FIG. 11 is read.

At S24, the average luminance value $B_R$ of the areas $I = 4$–10 is calculated. At S25, the sum total of D(1)–D(8) determined by $I = 1$–8 is found.

At S27, the weighting by the in-focus state is effected on the sum total of the luminance values BV(1)–BV(5) of the areas $I = 1$–5 to thereby calculate the luminance value $B_c$ of the central portion. In the other points, the flow of FIG. 12 is the same as the flow of FIG. 5.

As described above, according to the present invention, the focus detection area is divided into a plurality of units so that the in-focus state can be detected for each unit and by the use of this in-focus state information, weighting is effected on the outputs of the light metering area divided into a plurality of areas and proper exposure may be calculated and therefore, photographs of well-balanced exposure can be obtained.

Further, if the design is made such that as in the second and third embodiments, the light metering output is calculated by the use of the focus detection means, other advantages can be expected such as the possibility of the light metering area being finely divided, and the elimination of the necessity of the alignment between the light metering means and the focus detection means.

We claim:

1. An exposure control device in a camera comprising:

focus detection means for detecting a focus state with respect to each of a plurality of focus detection areas and producing a corresponding plurality of defocus amounts;

weight producing means for producing a plurality of weights corresponding to said plurality of focus detection areas on the basis of said plurality of defocus amounts, said weight producing means being capable of producing at least three different weights;

light metering means for light-metering a plurality of light metering areas at least partly overlapping with said plurality of focus detection areas and producing a plurality of light metering outputs; and exposure amount calculating means for calculating a proper exposure amount on the basis of said plurality of weights and said plurality of light metering outputs;

wherein for two defocus amounts having the same absolute value, and indicative, respectively, of the fact that an object image is on the object side relative to a film surface and of the fact that an object image is on the camera side relative to the film surface, said weight producing means produces two different weights, respectively.

2. A device according to claim 1, wherein said focus detection means has a plurality of photoelectric conversion elements and calculates said plurality of defocus amounts from the outputs of said plurality of photoelectric conversion elements, and said light metering means produces said plurality of light metering outputs on the basis of the outputs of at least some of said plurality of photoelectric conversion elements.

3. A device according to claim 1, further having exposure control means for controlling exposure on the basis of the output of said exposure amount calculating means, said exposure amount calculating means calculating the average luminance value of said plurality of light metering areas on the basis of said plurality of light metering outputs, and outputting a signal conforming to said average luminance value to said exposure control means when the sum of said plurality of weights is a predetermined value.

4. A device according to claim 1, wherein said exposure amount calculating means calculates the average luminance value of a plurality of areas not including said plurality of focus detection areas in said plurality of light metering areas on the basis of said plurality of light metering outputs, calculates the weighted mean luminance value of said plurality of light metering areas on the basis of said plurality of weights, and compares said average luminance value with said weighted means luminance value.

5. A device according to claim 4, further having exposure control means for controlling exposure on the basis of the output of said exposure amount calculating means, said exposure amount calculating means outputting a signal conforming to said weighted mean luminance value to said exposure control means when said average luminance value minus said weighted mean luminance value exceeds a predetermined value.

6. A device according to claim 4, further having exposure control means for controlling exposure on the basis of the output of said exposure amount calculating means, said exposure amount calculating means calculating a proper luminance value from said average luminance value and said weighted mean luminance value when said average luminance value minus said weighted mean luminance value on the basis of said average luminance value and said weighted mean luminance value does not exceed a predetermined value.

7. A device according to claim 1, wherein said exposure amount calculating means calculates the average luminance value of said plurality of light metering areas on the basis of said plurality of light metering outputs, calculates the weighted means luminance value of said plurality of light metering areas on the basis of said plurality of weights, and calculates a proper luminance value on the basis of said average luminance value and said weighted mean luminance value.

8. A device according to claim 1, wherein said exposure amount calculating means multiplies each of said plurality of light metering outputs by at least a corresponding one of said plurality of weights to calculate a means of said plurality of light metering outputs.

9. A device according to claim 1, wherein said plurality of focus detection areas belong to a plurality of groups which are not adjoining each other.

10. A device according to claim 1, wherein said weight producing means determines said plurality of weights on the basis of said plurality of defocus amounts and a photographing magnification.

11. A device according to claim 10, which further comprises means for detecting the focal length of the photographing lens, and wherein said weight producing means determines the photographing magnification on the basis of the detected focal length.

12. An exposure control device in a camera comprising:

focus detection means for detecting a focus state with respect to each of a plurality of focus detection areas and producing a corresponding plurality of defocus amounts;

weight producing means for producing a plurality of weights corresponds to said plurality of focus detection areas on the basis of said plurality of defocus amounts, said weight producing means being capable of producing at least three different weights;

first light metering means for light-metering a plurality of light metering areas at least partly overlapping with said plurality of focus detection areas and producing a plurality of first light metering outputs;

second light metering means for light-metering at least one other area than said plurality of light metering areas and producing at least one second light metering output; and exposure amount calculating means for calculating a proper exposure amount on the basis of at least said plurality of weights and said first light metering outputs when at least one of said plurality of defocus amounts is within a predetermined range, and calculating a proper exposure amount on the basis of said at least one second light metering output without the use of said plurality of first light metering outputs when said plurality of defocus amounts exceed said predetermined range;

wherein for two defocus amounts having the same absolute value, and indicative, respectively, of the fact that an object image is on the object side relative to a film surface and of the fact that an object image is on the camera side relative to the film surface, said weight producing means produces two different weights, respectively.

13. A camera comprising:

focus detecting means provided with a plurality of light receiving elements for determining a focus condition in a focus detecting area in an object field which is extended along a predetermined direction;

light metering means provided with a plurality of photoelectric conversion elements for light-metering a plurality of light metering areas in the object field which correspond, respectively, to said plurality of photoelectric conversion elements, said focus detection area extending in said predetermined direction substantially continuously over a group of said light metering areas and having a length in said predetermined direction that is substantially equal to the sum of a dimension of the light metering areas of said group in said predetermined direction, the remainder of said light metering areas being arranged around said group of light metering areas; and exposure amount calculating means for calculating a proper exposure amount on the basis of the outputs of said plurality of photoelectric conversion elements.

14. A camera according to claim 13, wherein said group of light metering areas consists of three light metering areas, and three of said photoelectric conversion elements correspond to said three light metering areas, respectively.

15. A camera according to claim 13, wherein a predetermined one of said photoelectric conversion elements corresponds to a doughnut-shaped light metering area which surrounds said group of light metering areas, and the remainder of said photoelectric conversion elements corresponds to four light metering areas which surround said doughnut-shaped light metering area.

16. An exposure control method in a camera comprising:

detecting a focus state with respect to each of a plurality of focus detection areas and producing a corresponding plurality of defocus amounts;

producing, from at least three different weights, a plurality of weights corresponding to said plurality of focus detection areas on the basis of said plurality of defocus amounts;

light-metering a plurality of light metering areas at least partly overlapping with said plurality of focus detection areas and producing a plurality of light metering outputs; and calculating a proper exposure amount on the basis of said plurality of weights and said plurality of light metering outputs;

wherein for two defocus amounts having the same absolute value, and indicative, respectively, of the fact that an object image is on the object side relative to a film surface and of the fact that an object image is on the camera side relative to the film surface, two different weights, respectively, are produced.

17. An exposure control method in a camera comprising:

detecting a focus state with respect to each of a plurality of focus detection areas and producing a corresponding plurality of defocus amounts;

producing, from at least three different weights, a plurality of weights corresponding to said plurality of focus detection areas on the basis of said plurality of defocus amounts;

light-metering a plurality of light metering areas at least partly overlapping with said plurality of focus detection areas and producing a plurality of first light metering outputs;

light-metering at least one other area than said plurality of light metering areas and producing at least one second light metering output; and calculating a proper exposure amount on the basis of at least said plurality of weights and said first light metering outputs when at least one of said plurality of defocus amounts is within a predetermined range, and calculating a proper exposure amount on the basis of said at least one second light metering output without the use of said plurality of first light metering outputs when said plurality of defocus amounts exceed said predetermined range;

wherein for two defocus amounts having the same absolute value, and indicative, respectively, of the fact that an object image is on the object side relative to a film surface and of the fact that an object image is on the camera side relative to the film surface, two different weights, respectively, are produced.

18. An exposure control method in a camera comprising:

providing a plurality of light receiving elements for determining a focus condition in a focus detecting area in an object field which is extended along a predetermined direction;

providing a plurality of photoelectric conversion elements for light-metering a plurality of light metering areas in the object field which correspond, respectively, to said plurality of photoelectric conversion elements, said focus detection area extending in said predetermined direction substantially continuously over a group of said light metering areas and having a length in said predetermined direction that is substantially equal to the sum of a dimension of the light metering areas of said group in said predetermined direction, the remainder of said light metering areas being arranged around said group of light metering areas; and calculating a proper exposure amount on the basis of the outputs of said plurality of photoelectric conversion elements.

* * * * *